US008024720B2

(12) United States Patent
Inglis et al.

(10) Patent No.: US 8,024,720 B2
(45) Date of Patent: Sep. 20, 2011

(54) SPECULATIVE INLINING OF OVERRIDDEN METHODS WITHOUT USING PROFILING INFORMATION

(75) Inventors: Derek Bruce Inglis, Markham (CA); Vijay Sundaresan, North York (CA); Dina Tal, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1554 days.

(21) Appl. No.: 11/405,093

(22) Filed: Apr. 17, 2006

(65) Prior Publication Data
US 2007/0245324 A1 Oct. 18, 2007

(51) Int. Cl.
*G06F 9/45* (2006.01)
(52) U.S. Cl. ........ 717/159; 717/145; 717/147; 717/148; 717/153; 717/158
(58) Field of Classification Search .................. None
See application file for complete search history.

(56) References Cited

U.S. PATENT DOCUMENTS

| 5,995,754 | A | * | 11/1999 | Holzle et al. | ............. | 717/158 |
| 6,317,796 | B1 | * | 11/2001 | Bak et al. | ............. | 719/315 |
| 6,971,091 | B1 | * | 11/2005 | Arnold et al. | ............. | 717/145 |
| 7,137,123 | B2 | * | 11/2006 | Bak et al. | ............. | 719/315 |

OTHER PUBLICATIONS

Reducing Virtual Call Overheads in a Java VM Just-in-Time Compiler Junpyo Lee, Byung-Sun Yang, Suhyun Kim, Seungll Lee, Yoo C. Chung, Heungbok Lee, Je Hyung Lee, Soo-Mook Moon ACM SIGARCH Computer Architecture News archive vol. 28 , Issue 1 (Mar. 2000) pp. 21-33.*
Dynamic Path Profile Aided Recompilation in a JAVA Just-In-Time Compiler R. Vinodh Kumar, B. Lakshmi Narayanan, and R. Govindarajan HiPC 2002, LNCS 2552, pp. 495-506 Year of publication: 2002.*
The Java HotSpot Server Compiler Michael Paleczny, Christopher Vick, Cliff Click Proceedings of the Java™ Virtual Machine Research and Technology Symposium Year of publication: 2001.*
Reconciling Responsiveness with Performance in Pure Object-Oriented Languages Urs Holzle, David Ungar ACM Transactions on Programming Languages and Systems, vol. 18, No. 4 pp. 355-400 Year of publication 1999.*
Optimizing Dynamically-Dispatched Calls with Run-Time Type Feedback Urs Holzle, David Ungar SIGPLAN 94-Jun. 1994 Ortando, Florida USA Year of publication: 1994.*

(Continued)

*Primary Examiner* — Emerson C Puente
*Assistant Examiner* — Paul Mills
(74) *Attorney, Agent, or Firm* — Yee & Associates, P.C.; Ayla A. Lari

(57) ABSTRACT

A computer implemented method, computer usable program code, and a data processing system for selecting a candidate implementation of a virtual overridden method for inlining into a calling method. A determination as to which implementation of a virtual overridden method to inline is made based on its relative "hotness" compared to the other implementations of the same method. The relative hotness can be inferred from the invocation count and sampling count that the virtual machine and the just-in-time compiler already collect for other purposes, that is, without collecting and storing of call-edge profiling information. When a method is being compiled and it is identified that the method contains a call to an overridden method, a candidate for inlining from among the implementations of the overridden method is selected based on relative hotness values. The candidate implementation of the overridden method is then inlined, with a guard, into the calling method.

22 Claims, 8 Drawing Sheets

OTHER PUBLICATIONS

Adaptive Optimization for Self: Reconciling High Performance with Exploratory Programming Urs Hölzle Report Number: TR-95-35; pp. 1-4, 13-15, 46-63 Mar. 1995.*

Eliminating Virtual Function Calls in C++ Programs Gerald Aigner, Urs Hölzle Technical Report TRCS 95-22, Department of Computer Science, University of California, Santa Barbara Dec. 1995.*

Profile-Guided Receiver Class Prediction David Grove, Jeffrey Dean, Charles Garrett, and Craig Chambers OOPSLA '95 Year of Publication: 1995.*

Measurement and Application of Dynamic Receiver Class Distributions Charles D. Garrett, Jeffrey Dean, David Grove, and Craig Chambers Department of Computer Science and Engineering; Technical Report 94-03-05 May 1994.*

A Survey of Adaptive Optimization in Virtual Machines Matthew Arnold, Stephen J. Fink, David Grove, Michael Hind, and Peter F. Sweeney Proceedings of the IEEE, vol. 93, No. 2, pp. 449-466 Feb. 2005.*

Adaptive Optimization in the Jalapeno JVM Matthew Arnold, Stephen Fink, David Grove, Michael Hind, Peter F. Sweeney OOPLSA '00, pp. 47-65 Year of publication:2000.*

Design, Implementation and Evaluation of Adaptive Recompilation with On-Stack Replacement Stephen J. Fink, Feng Qian Proceedings of the International Symposium on Code Generation and Optimization (CGO'03) 2003.*

Collecting and Exploiting High-Accuracy Call Graph Profiles in Virtual Machines Matthew Arnold David Grove Proceedings of the International Symposium on Code Generation and Optimization (CGO'05) 2005.*

An Empirical Study of Method Inlining for a Java Just-In-Time Compiler Toshio Suganuma, Toshiaki Yasue, Toshio Nakatani Proceedings of the 2nd JavaTM Virtual Machine Research and Technology Symposium Aug. 2002.*

* cited by examiner

```
         class A {
             int getValue() { return 0; }
             . . .
         } class B extends A {
             int getValue() {return 1; }      // this implementation overrides A's
                                              // implementation of getValue()
FIG. 4        . . .
         } class C extends A {                  // doesn't provide its own implementation
                                              // of getValue()
             . . .
         }
```

400

```
class MyClass {
    A a;

MyClass (A a_) {    //constructor for class MyClass
        a = a_;         // initializes the class member a
    } void doSomething() {
        A a1 = new A();
        B b = new B();
        C c = new C();
        System.out.println( a1.getValue() );
        System.out.println( b.getValue() );
        System.out.println( c.getValue() );
        System.out.println( a.getValue() );
    }
    ...
}
```

SPECULATIVE INLINING OF OVERRIDDEN METHODS WITHOUT USING PROFILING INFORMATION

BACKGROUND OF THE INVENTION

1. Field of the Invention

The present invention relates generally to data processing and, more particularly, to inlining into a caller method.

2. Description of the Related Art

Inlining is a method of improving program performance by embedding the body of a callee into the body of its caller. The performance improvement is gained by eliminating the overhead of an invocation and exposing additional optimization opportunities in the combined code. One of the fundamental elements of the Java™ programming language is its object-oriented class hierarchy (JAVA and all JAVA-based trademarks are trademarks of Sun Microsystems, Inc. in the United States, other countries, or both). Therefore, a method implementation in a class, A, can be overridden by an implementation of the same method in a subclass of A. A method that can be overridden is called a "virtual method."

When there is more than one implementation of a callee, any of the implementations can be called, or even all of them at different executions of the call. This makes inlining of virtual methods challenging in terms of trying to improve performance and preserving correctness. In other words, it is important to inline the "right" method, or the method that is "right" the majority of the time, but always execute the correct implementation for the call. If the right implementation is not inlined, then the code will have to make an invocation, which slows down execution; therefore, it is important to be right more often to achieve the desired performance gain.

One existing solution to inlining virtual methods is to limit inlining to cases where the callee is not overridden at the time the caller gets compiled, using an "override guard" for correctness. An "override guard" is a relatively inexpensive test that checks whether a method implementation got overridden. Information identifying whether a method is overridden gets updated in the Java virtual machine when a class with an overriding implementation gets loaded. In an object-oriented class hierarchy, where method overriding is common, this limitation is too strict. For example, there are cases where the same implementation will always be called at a particular call-point and still will not be inlined, simply because another implementation of that method exists.

Another existing solution is to use profiling information to choose which method to inline and to inline it using a "virtual guard." A "virtual guard" is more expensive than an "override guard," but allows the caller to keep using the inlined implementation, even if it got overridden, as long as it can verify that this is the appropriate implementation. Using profiling information can be quite expensive in terms of memory usage and performance, because it requires collecting and keeping profiling data for every call edge in the call-graph.

Yet another existing solution inlines when the callee is not overridden at the time the caller gets compiled without using an "override guard." This method requires re-compiling the caller (using "on stack replacement" when needed) for correctness when an overriding implementation of the callee gets loaded. The advantage of this method is that there is no need for a "virtual guard" when there are no additional implementations of the method, which may improve performance over the "virtual guard" solution. On the other hand, this method requires a decompile and recompile whenever a class with an overriding method gets loaded.

SUMMARY OF THE INVENTION

In one aspect, the present invention is directed to a computer implemented method of compiling code in a virtual machine. The method identifies an overridden method that is called by a calling method, selects an implementation of the overridden method based on a hotness value derived from invocation count and sampling count already collected in the virtual machine, and inlines, with a guard, that implementation of the overridden method within the calling method.

Selection of the implementation of the overridden method does not require collection of any additional profiling information.

In one embodiment, selecting the implementation of the overridden method comprises determining whether an overridden method to be called by the calling method is abstract, and, in response to a determination that the overridden method to be called by the calling method is abstract, selecting an implementation of the overridden method that is the only implementation of that method and is hot enough as a selected implementation. The method also comprises, in response to a determination that the overridden method to be called by the calling method is not abstract, selecting a significantly hottest hot enough implementation of the overridden method as the selected implementation. Alternatively, the method comprises, in response to a determination that the overridden method to be called by the calling method is not abstract, selecting a single hot enough implementation of the overridden method as the selected implementation. Alternatively, the method comprises selecting a significantly hottest hot enough implementation of the overridden method as the selected implementation, regardless of whether or not the overridden method is abstract.

The method further comprises, prior to inlining the selected implementation of the overridden method, determining that the selected implementation of the overridden method is hot enough. Preferably, determining that the selected implementation of the overridden method is hot enough comprises determining that the hotness value of the selected implementation is greater than or equal to a heuristic value multiplied by a predetermined hotness threshold. Selecting the implementation of the overridden method comprises determining whether one candidate implementation of the overridden method is hotter than another candidate implementation of the overridden method. The one candidate implementation of the overridden method has a first hotness value and the another candidate implementation of the overridden method has a second hotness value, and one candidate implementation is hotter than another candidate implementation when the first hotness value is greater than the second hotness value.

Selecting the implementation of the overridden method comprises determining whether one candidate implementation of the overridden method is significantly hotter than another candidate implementation of the overridden method. Preferably, the first candidate implementation of the overridden method has a first hotness value, the second candidate implementation of the overridden method has a second hotness value, and determining whether a first candidate implementation of the overridden method is significantly hotter than a second candidate implementation of the overridden method comprises determining whether the difference between the first hotness value and the second hotness value is greater than or equal to a predefined threshold.

In other aspects, the present invention is directed to a computer program product and to a data processing system for implementing the above-described method.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an example of code with a class hierarchy where a method gets overridden in accordance with an exemplary embodiment;

DETAILED DESCRIPTION OF THE PREFERRED EMBODIMENT

Figure 1:
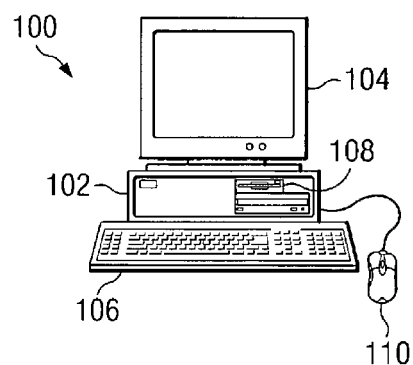
FIG. 1 is a pictorial representation of a data processing system in which aspects of the present invention may be implemented.
Figure 2:
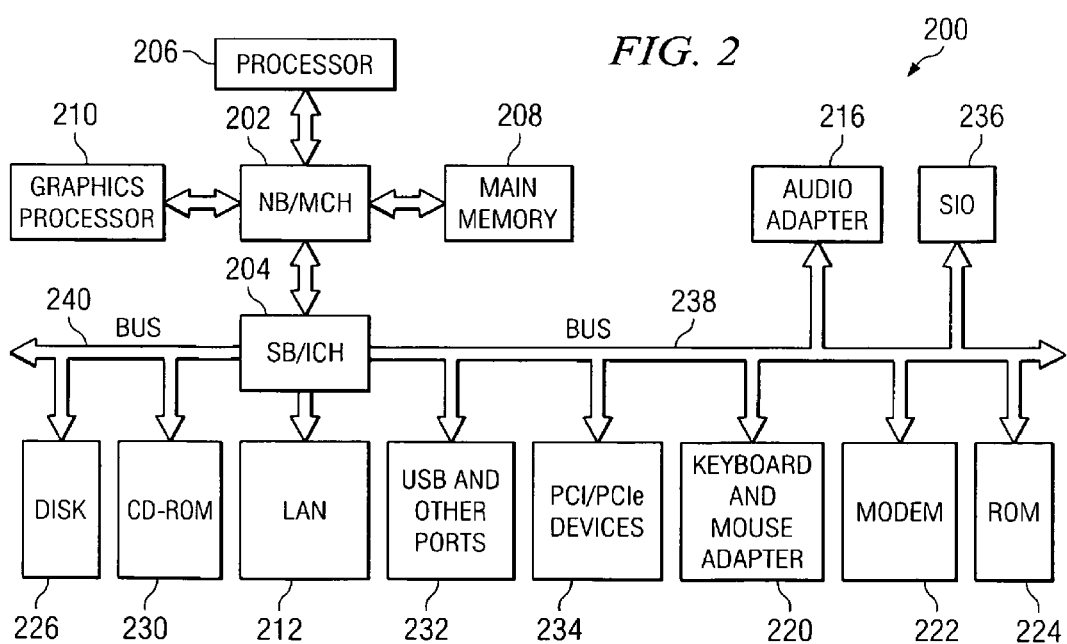
FIG. 2 is a block diagram of a data processing system in which aspects of the present invention may be implemented.

With reference now to the figures and in particular with reference to FIGS. 1-2, exemplary diagrams of data processing environments are provided in which aspects of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 is a pictorial representation of a data processing system in which aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 may be implemented using any suitable computer, such as an IBM® eServer™ computer or IntelliStation® computer, which are products of International Business Machines Corporation, located in Armonk, N.Y. Although the depicted representation shows a computer, exemplary aspects of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the exemplary aspects may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 connect to south bridge and I/O controller hub 204 through bus 238. Hard disk drive (HDD) 226 and CD-ROM drive 230 connect to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200.

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A memory may be, for example, main memory 208 or a cache such as found in north bridge and memory controller hub 202. A processing unit may include one or more processors. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
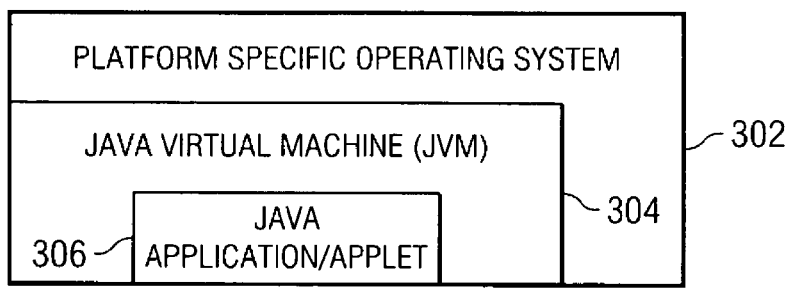
FIG. 3 is a block diagram illustrating the relationship of software components operating within a computer system that may implement exemplary aspects of the present invention.

With reference now to FIG. 3, a block diagram illustrates the relationship of software components operating within a computer system that may implement exemplary aspects of the present invention. Java programming system 300 includes platform specific operating system 302 that provides hardware and system support to software executing on a specific hardware platform. Java virtual machine (JVM) 304 is one software application that may execute in conjunction with the operating system. Java virtual machine 304 provides a Java run-time environment with the ability to execute Java application or applet 306, which is a program, servlet, or software component written in the Java programming language. The computer system in which Java virtual machine 304 operates may be similar to data processing system 200 or computer 100 described above. However, Java virtual machine 304 may be implemented in dedicated hardware on a Java™ Chip device or Java processor with an embedded picoJava™ core. (Java and all Java-based trademarks are trademarks of Sun Microsystems, Inc. in the United States, other countries, or both.)

At the center of a Java run-time environment is the Java virtual machine, which supports all aspects of the run-time environment, including its architecture, security features, mobility across networks, and platform independence. The Java virtual machine is a virtual computer, i.e. a computer that is specified abstractly. The specification defines certain features that every Java virtual machine must implement, with some range of design choices that may depend upon the platform on which the Java virtual machine is designed to execute. For example, all Java virtual machines must execute Java bytecodes and may use a range of techniques to execute the instructions represented by the bytecodes. A Java virtual machine may be implemented completely in software or somewhat in hardware. This flexibility allows different Java virtual machines to be designed for mainframe computers and PDAs.

The Java virtual machine is the name of a virtual computer component that actually executes Java programs. Java programs are not run directly by the central processor but instead by the Java virtual machine, which is itself a piece of software running on the processor in most cases. The Java virtual machine allows Java programs to be executed on a different platform as opposed to only the one platform for which the code was compiled.

Java programs are compiled for the Java virtual machine. In this manner, the Java run-time environment is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the Java virtual machine that alternately decodes and interprets a bytecode or bytecodes. These bytecode instructions are designed to be easy to interpret on any computer and easily translated on the fly into native machine code. Byte codes may be translated into native code by a just-in-time compiler or JIT.

A Java virtual machine loads class files and executes the bytecodes within them. A class loader loads the class files in the Java virtual machine. The class loader loads class files from an application and the class files from the Java application programming interfaces (APIs) that are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for "jitting" a method. The native machine code for the method is then cached and reused upon the next invocation of the method. The execution engine may also be implemented in hardware and embedded on a chip so that the Java bytecodes are executed natively. Java virtual machines usually interpret bytecodes, but Java virtual machines may also use other techniques, such as just-in-time compiling, to execute bytecodes.

When an application is executed on a Java virtual machine that is implemented in software on a platform-specific operating system, a Java application may interact with the host operating system by invoking native methods. A Java method is written in the Java programming language, compiled to bytecodes, and stored in class files. A native method is written in some other language and compiled to the native machine code of a particular processor. Native methods are stored in a dynamically linked library whose exact form is platform specific.

Inlining is a method of improving program performance by embedding the body of a callee into the body of its caller. The performance improvement is gained by eliminating the overhead of an invocation and exposing additional optimization opportunities in the combined code. One of the fundamental elements of the Java programming language is its object-oriented class hierarchy. Therefore, a method implementation in a class, A, can be overridden by an implementation of the same method in a subclass of A. A method that can be overridden is called a "virtual method."

When there is more than one implementation of a callee, any of the implementations can be called, or even all of them at different executions of the call. This makes inlining of virtual methods challenging in terms of trying to improve performance and preserving correctness. In other words, it is important to inline the "right" implementation of the method, or the implementation that is "right" the majority of the time, but always execute the correct implementation for the call. If the right implementation is not inlined, then the code will have to make an invocation, which slows down the execution; therefore, it is important to be right more often to achieve the desired performance gain.

FIG. 4 is an example of code with a class hierarchy where a method gets overridden in accordance with an exemplary embodiment. Code 400 defines class A, class B, and class C. Class A declares a method called getValue( ) and provides its implementation. Class B extends class A and provides its own implementation of getValue( ) which overrides the implementation defined in class A. Class C extends class A, but does not provide its own implementation of getValue( ).

Since classes B and C extend class A, i.e. B and C are sub-classes of A, all objects of B and C are also objects of A. Therefore, an object of A can be one of the following in the class hierarchy defined in code 400:
  object of A and not object of B or C;
  object of A and object of B;
  object of A and object of C.
If getValue( ) is invoked for an object of B, the implementation of getValue( ) from B has to be executed. If getValue( ) is invoked for an object of A that is not an object of B, the implementation of getValue( ) from A has to be executed. If getValue( ) is invoked for an object of C, the implementation of getValue( ) from A has to be executed.

Figures 5, 6:
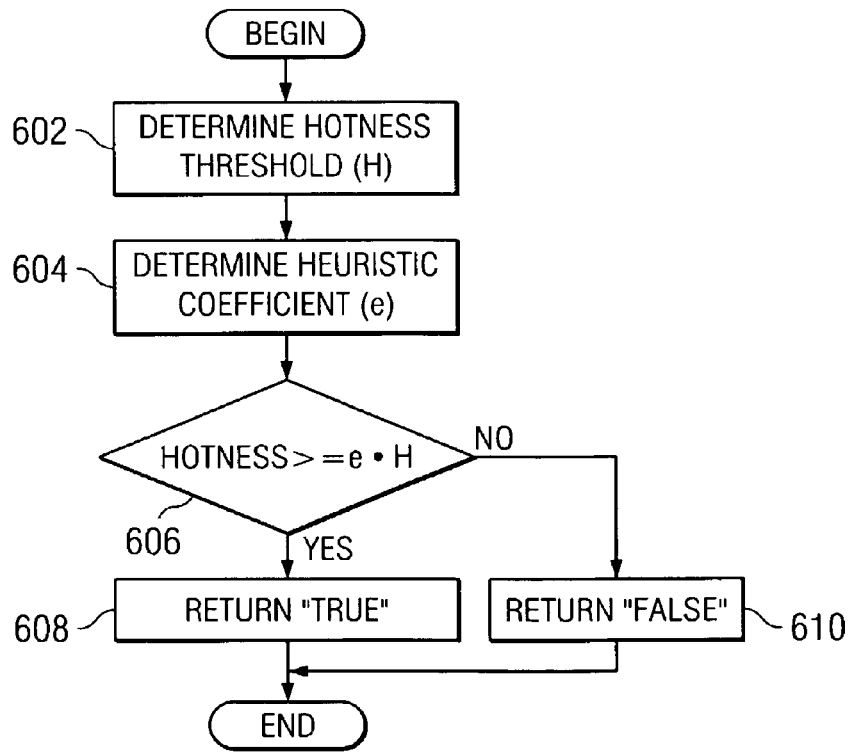
FIG. 5 is an example of code that performs invocations of the methods from a class hierarchy in accordance with an exemplary embodiment.
FIG. 6 is a flowchart illustrating the operation of a virtual machine for determining whether an implementation of a method is hot enough in accordance with an exemplary embodiment.

FIG. 5 is an example of code that performs invocations of the method getValue( ) for objects of A, B and C in accordance with an exemplary embodiment. The object a1 is an object of class A and not an object of either B or C. Therefore, in a1.getValue( ) it is A's implementation of the method that should be called. The object b is an object of B and A. Class B overrides A's implementation of getValue( ) Therefore, in b.getValue( ) it is B's implementation of the method that should be called. The object c is an object of C and A. Class C does not override A's implementation of getValue( ). Therefore, in c.getValue( ) it is A's implementation of the method that should be called.

Object a is any object of class A; therefore, it can be either an object of B, or an object of C, or an object of A and neither an object of B nor C. As a result, either of the above implementations of getValue( ) can be executed for a.

Where the Java virtual machine cannot guarantee that the inlined implementation is the only implementation of the method that can be called, the inlined implementation should be protected by a test (a "guard") that checks whether the inlined implementation of the method is the implementation to be executed at the call time. In the case where the test fails, the "slow" path is taken, meaning the method invocation will take place.

In accordance with an exemplary embodiment, a technique is used for inlining overridden methods. As used herein, the term "overridden method" refers to both the case of a virtual method with more than one implementation, and also the case of an abstract method with any number of implementations, including an abstract method having only a single implementation. The technique decides which implementation of an overridden method to inline based on its relative "hotness"

compared to the other implementations of the same method. The relative hotness can be inferred from the invocation count and sampling count that the Java virtual machine and the just-in-time compiler already collect for other purposes. Invocation count is simply the number of times an implementation of a method has been invoked. Sampling is a method to determine execution length of a method implementation. Thus, the hotness of a method implementation can be determined as follows:

$$HV=IF \cdot IC + SF \cdot NS,$$

where HV is the hotness value of the method implementation; IF is a predefined invocation factor; IC is the invocation count of the method implementation; SF is a predefined sampling factor; NS is the number of times the implementation has been sampled. Even though the invocation count for a method implementation is not collected after the implementation gets compiled, the sampling information, which is always collected, keeps contributing to calculation of the hotness value of the method.

By allowing inlining even when multiple implementations of an overridden method exist and not requiring the collection and storage of call-edge profiling information, the present invention may enable considerable performance improvements on systems with ample processor and memory resources, as well as resource constrained systems with slow processors or limited amounts of available memory, where compile-time resource requirements may severely affect overall program performance.

An implementation, A, of a method, M, is said to be "hot" if its "hotness" has reached a certain threshold, H. When the hotness of A reaches H, A normally gets compiled into machine-specific code by the just-in-time compiler. Implementation A of method M is said to be "hot enough" if its "hotness" has reached a sub-threshold, $H_e = e \cdot H$ of the threshold H, where e is a predetermined heuristic value between zero and one. For example, e may be 0.9. If A is "hot enough," then A is close to being compiled.

FIG. 6 is a flowchart illustrating the operation of a virtual machine for determining whether an implementation of a method is hot enough in accordance with an exemplary embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks.

These computer program instructions may also be stored in a computer-readable memory, transmission medium, or storage medium that can direct a processor or other programmable data processing apparatus to function in a particular manner, such that the instructions stored in the computer-readable memory, transmission medium, or storage medium produce an article of manufacture including instruction means which implement the functions specified in the flowchart block or blocks.

Accordingly, blocks of the flowchart illustrations support combinations of means for performing the specified functions, combinations of steps for performing the specified functions and computer usable program code for performing the specified functions. It will also be understood that each block of the flowchart illustrations, and combinations of blocks in the flowchart illustrations, can be implemented by combinations of special purpose hardware and computer instructions which perform the specified functions or steps.

With particular reference to FIG. 6, operation begins and the virtual machine determines the hotness threshold, H (block 602) and determines the heuristic coefficient, e (block 604). When the hotness of a method implementation reaches H, it is said to be "hot" and normally gets compiled into machine-specific code by the just-in-time compiler. When the hotness of a method implementation reaches a sub-threshold, $H_e = e \cdot H$, of the threshold H, the method implementation is said to be "hot enough" and is close to being compiled.

Then, the virtual machine determines whether the hotness of the method implementation is greater than or equal to the sub-threshold, $H_e$ (block 606). If the hotness is greater than or equal to $H_e$, the virtual method returns a "true" value (block 608), indicating that implementation of the method is hot enough, and operation ends. However, if the hotness of the method implementation is less than $H_e$ in block 606, the virtual machine returns a "false" value (block 610), indicating that the implementation of the method is not hot enough, and operation ends.

Figure 7:
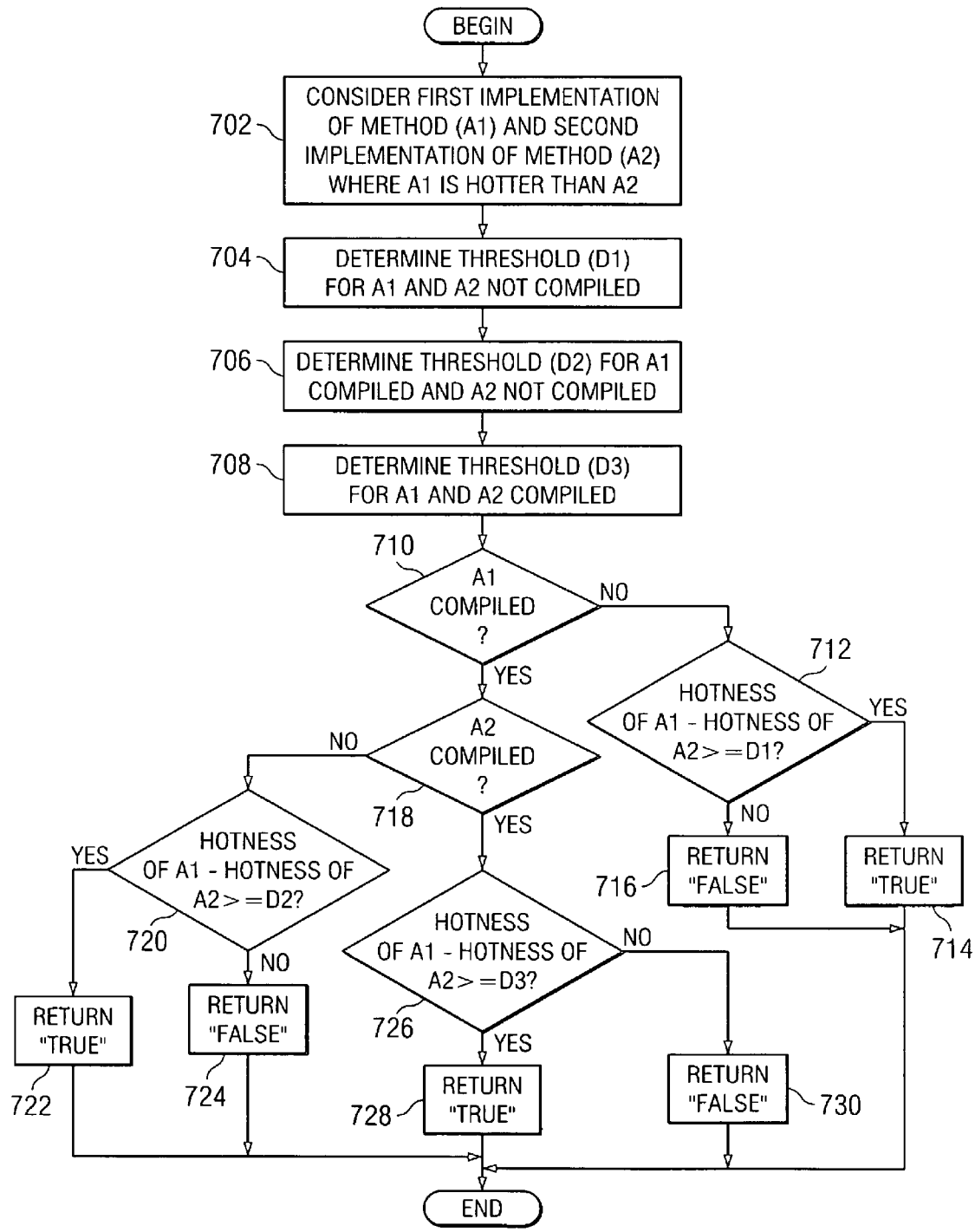
FIG. 7 is a flowchart illustrating the operation of a virtual machine for determining whether an implementation of a method is significantly hotter than another implementation of the same method in accordance with an exemplary embodiment.

With reference now to FIG. 7, a flowchart illustrating the operation of a virtual machine for determining whether an implementation of a method is significantly hotter than another implementation of the same method is shown in accordance with an exemplary embodiment. This operation is further described in block 1036 of FIG. 10. It is to be understood for the purposes of the examples, that the terms first implementation, and second implementation or one implementation, and another implementation are used merely as examples and do not indicate order, position, or preference. Operation begins and the virtual machine considers the first implementation, A1, of the method in question and the second implementation, A2, where A1 is hotter than A2 (block 702) as predetermined. The virtual machine determines a threshold, D1, for the case where A1 and A2 are not compiled (block 704), a threshold, D2, for the case where A1 is compiled and A2 is not compiled (block 706), and a threshold, D3, for the case where A1 and A2 are compiled (block 708).

Next, the virtual machine determines whether A1 is compiled (block 710). If A1 is not compiled, the virtual machine determines whether the difference in hotness between A1 and A2 is greater than or equal to D1 (block 712). If the difference in hotness between A1 and A2 is greater than or equal to D1, then the virtual machine returns a value of "true" (block 714), indicating that A1 is significantly hotter than A2, and operation ends. If the difference in hotness between A1 and A2 is less than D1 in block 712, then the virtual machine returns a "false" value (block 716), indicating that A1 is not significantly hotter than A2, and operation ends. It will be appreciated that, because A1 is predetermined to be hotter than A2, it is generally not necessary to account for the situation in which A1 is not compiled but A2 is compiled. Since hotness determines whether an implementation of a method is compiled, if A1 is not compiled, A2 will also be not compiled because A1 is hotter than A2.

Returning to block 710, if the virtual machine determines that A1 is compiled, the virtual machine determines whether A2 is compiled (block 718). If A2 is not compiled, the virtual machine determines whether the difference in hotness between A1 and A2 is greater than or equal to D2 (block 720). If the difference in hotness between A1 and A2 is greater than or equal to D2, then the virtual machine returns a value of "true" (block 722), indicating that A1 is significantly hotter than A2, and operation ends. If the difference in hotness between A1 and A2 is less than D2 in block 720, then the virtual machine returns a "false" value (block 724), indicating that A1 is not significantly hotter than A2, and operation ends.

If the virtual machine determines that A1 and A2 are compiled in block 718, the virtual machine determines whether the difference in hotness between A1 and A2 is greater than or equal to D3 (block 726). If the difference in hotness between A1 and A2 is greater than or equal to D3, then the virtual machine returns a value of "true" (block 728), indicating that A1 is significantly hotter than A2, and operation ends. If the difference in hotness between A1 and A2 is less than D3 in block 726, then the virtual machine returns a "false" value (block 730), indicating that A1 is not significantly hotter than A2, and operation ends.

Finally, the virtual machine may determine that an implementation of a method is "significantly hottest" if it is "significantly hotter than" all other implementations of the same method.

Figure 8:
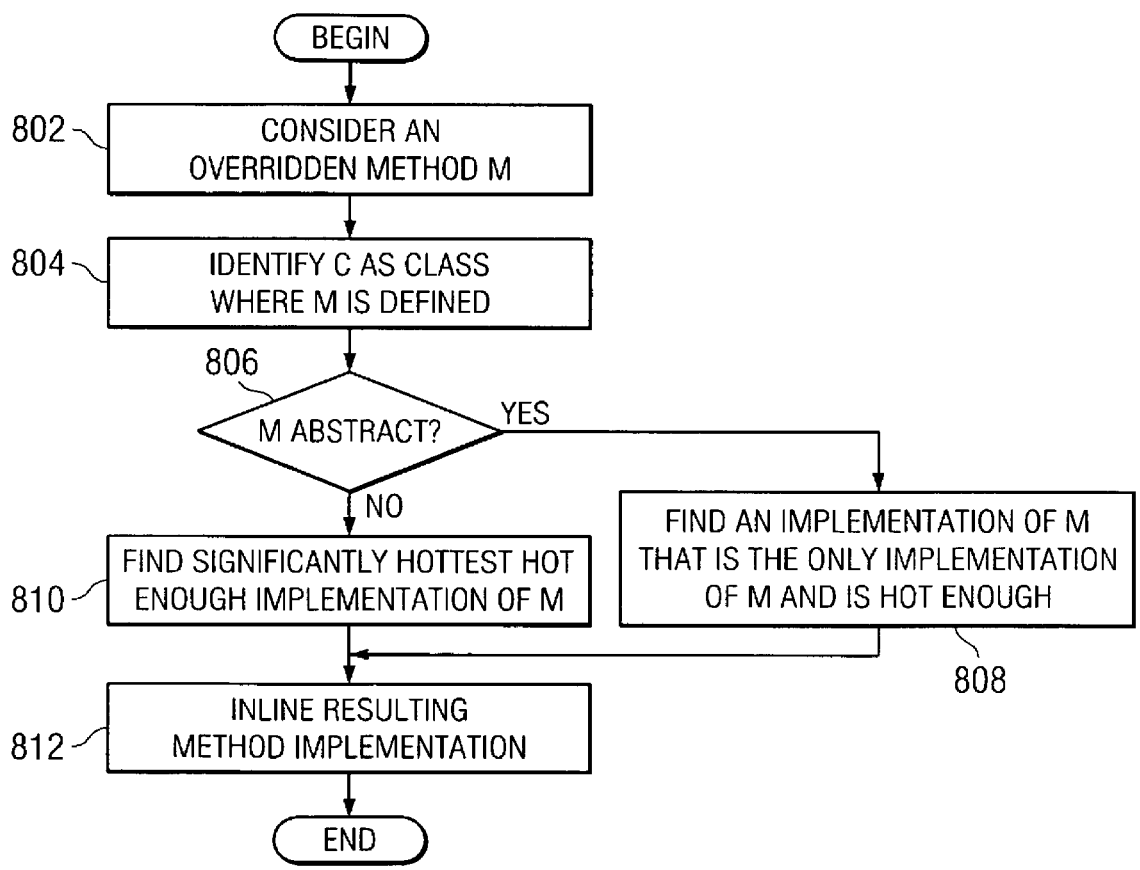
FIG. 8 is a flowchart illustrating the operation of a virtual machine for determining which, if any, implementation of the method to inline in accordance with an exemplary embodiment.

FIG. 8 is a flowchart illustrating the operation of a virtual machine for determining which, if any, implementation of the method to inline in accordance with an exemplary embodiment. Operation begins and the virtual machine considers an overridden method M (block 802). The virtual machine identifies a class, C, where M is defined (block 804).

Then, the virtual machine determines whether M is abstract (block 806), that is, declared but not implemented. If M is abstract, the virtual machine finds an implementation of method M that is the only implementation of that method and is hot enough (block 808). The operation of finding such implementation of the method is described in further detail below with reference to FIG. 9. If M is not abstract in block 806, the virtual machine finds a significantly hottest hot enough implementation of the method (block 810). The operation of finding a significantly hottest hot enough implementation is described in further detail below with reference to FIG. 10. Alternatively, the virtual machine can use the algorithm for finding a significantly hottest hot enough implementation regardless of M being abstract or not. This would be more accurate and only slightly less resource friendly.

In block 812 the virtual machine inlines the selected implementation found. Thereafter, operation ends.

Alternatively, in block 810 the virtual machine may use an even more resource friendly, but less accurate, technique that looks for the hottest implementation that is a single hot enough implementation rather than looking for a significantly hottest hot enough implementation. The operation of finding a single hot enough implementation of the method is described in further detail below with reference to FIG. 11.

The specification of the Java programming language allows for classes to be dynamically loaded and unloaded during program execution. This property of the Java language is facilitated by means of class loaders. When the class loader of the class $C_1$ implementing a candidate for inlining is different from the class loader of the class $C_2$ implementing the caller and $C_1$ can be unloaded, either the candidate for inlining should not be inlined or measures should be taken in the event of the callee's class being unloaded. For example, the virtual machine may need to recompile the caller or patch the virtual guard.

Figure 9:
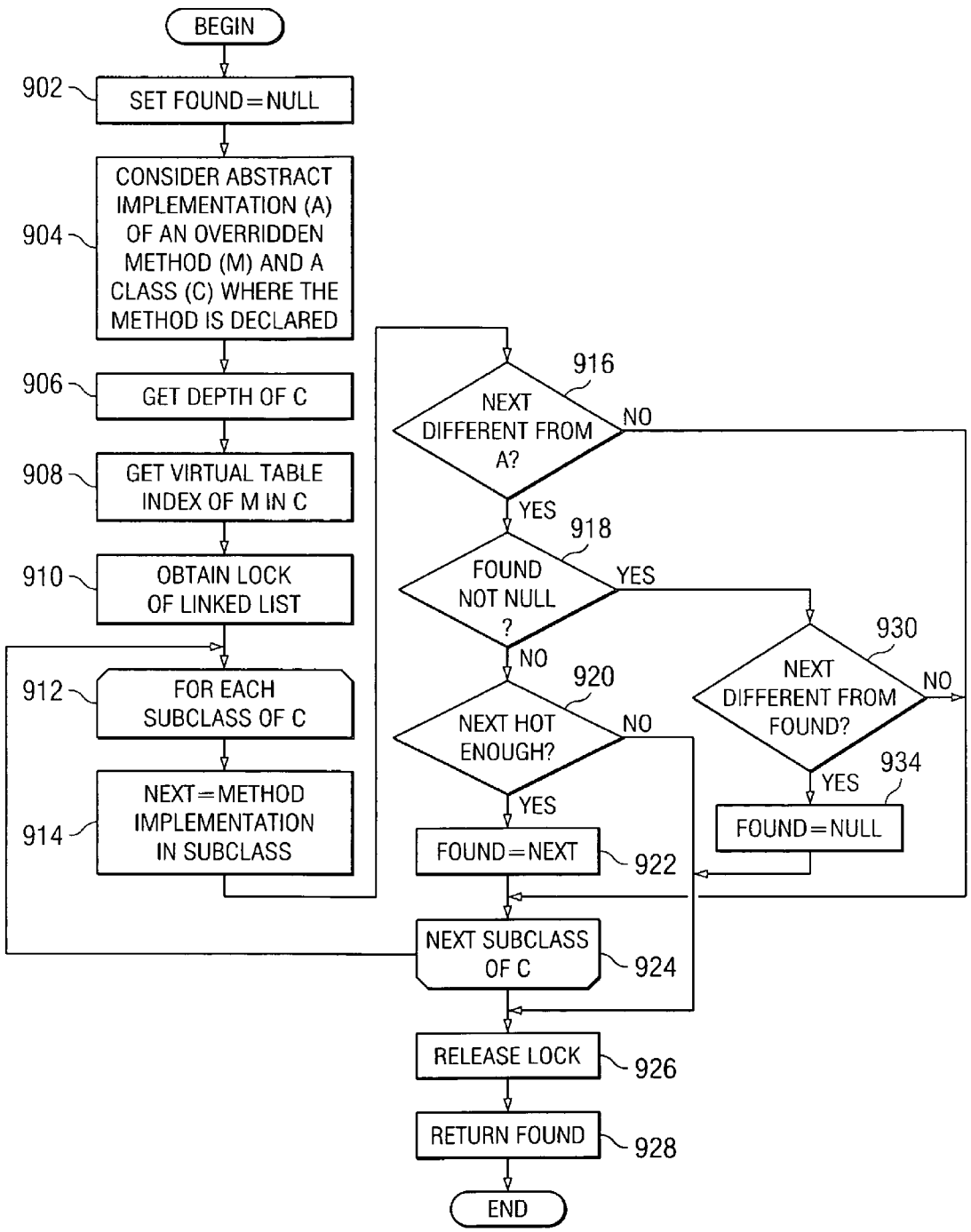
FIG. 9 is a flowchart illustrating operation of a virtual machine for finding an implementation of a method that is the only implementation of that method and is hot enough in accordance with an exemplary embodiment.

FIG. 9 is a flowchart illustrating operation of a virtual machine for finding an implementation of a method that is the only implementation of that method and is hot enough in accordance with an exemplary embodiment. If the implementation is not hot enough, or there is more than one implementation of the method, the process will return NULL. This process is an expansion of block 808 in FIG. 8.

Operation begins and the virtual machine sets found to be NULL (block 902). Next, the virtual machine considers an abstract implementation, A, of an overridden method, M, and a class, C, where the method is declared (block 904). Then, the virtual machine gets the depth of C (block 906) and gets the virtual table index of M in C (block 908). The virtual machine obtains a lock of the linked list (block 910) of subclass of C.

For each subclass of C (block 912), the virtual machine sets next to be the method implementation in the subclass (block 914). The virtual machine determines whether next is different from A (block 916). If next is not a different implementation from A in block 916, then operation proceeds to block 924 to consider the next subclass of C and loop back to block 912. If next is a different implementation from A, the virtual machine determines whether an overriding implementation had been found before (block 918).

If an overriding implementation has been found (found≠NULL) in block 918, the virtual machine determines whether next is a different implementation from found (block 930). If next is different from found, then the virtual machine sets found equal to NULL (block 934), and operation proceeds to block 926 to release the lock and return found as NULL, in block 928, indicating that there is more than one implementation of the method. If next is not different from found in block 930, then operation proceeds to block 924 to consider the next subclass in C and loop back to block 912.

If an overriding implementation of A had not been found before (found=NULL) in block 918, the virtual machine determines whether next is hot enough (block 920). If next is not hot enough in block 920, the virtual machine releases the lock (block 926) and returns found as NULL, indicating that even if there is only one implementation of this method (i.e. even if the implementation just examined is the only implementation of the method), it is not hot enough. If next is hot enough, the virtual machine sets found to next (block 922). Then, the virtual machine considers the next subclass of C (block 924), and operation loops back to block 912.

When there are no more subclasses of C to consider in block 924, the virtual machine releases the lock (block 926), returns found as the single implementation of the method (block 928), and operation ends.

Figure 10:
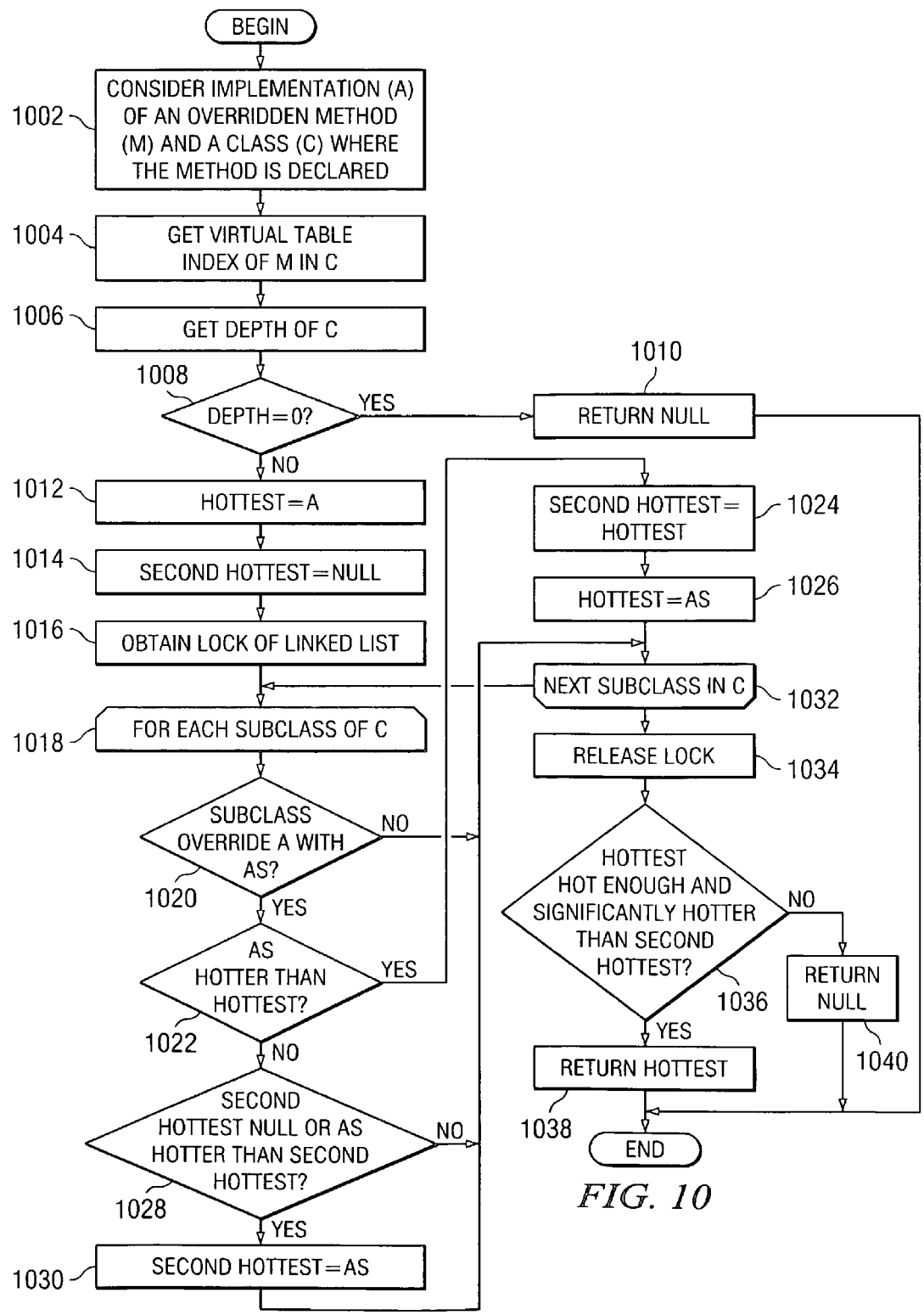
FIG. 10 is a flowchart illustrating the operation of a virtual machine for finding a significantly hottest hot enough implementation of a method in accordance with an exemplary embodiment.

Turning to FIG. 10, a flowchart illustrating the operation of a virtual machine for finding a significantly hottest hot enough implementation of a method is shown in accordance with an exemplary embodiment. This process is one exemplary expansion of block 810 in FIG. 8. The virtual machine looks for the two hottest implementations. If the hottest implementation among them is hot enough and significantly hotter than the other, then it is returned as the candidate for inlining. Otherwise, the virtual machine returns NULL. There will always be at least two implementations of M in this case, because that is the case of a non-abstract overridden method.

Operation begins and the virtual machine considers an implementation, A, of an overridden method, M, and a class, C, where the method is declared (block 1002). The virtual machine gets the virtual table index of M in C (block 1004) and gets the depth of C (block 1006).

The virtual machine determines whether the depth of C is zero (block 1008). If the depth of C is zero, the virtual machine returns NULL (block 1010). This is the case where C is java.lang.Object. The interface classes are direct subclasses of Object; however, they do not have virtual tables. Thus, the virtual machine skips traversing in this case. Thereafter, operation ends. However, if the depth of C is not zero in block 1008, the virtual machine sets hottest to be A (block 1012) and sets 2nd hottest to be NULL (block 1014). Then, the virtual machine obtains a lock of the linked list (block 1016) of subclasses of class C.

For each subclass of C (block 1018), the virtual machine determines whether the subclass overrides A with an implementation, AS, of M (block 1020). If the subclass overrides A, the virtual machine determines whether AS is hotter than hottest (block 1022). If AS is hotter than hottest, then the virtual machine sets 2nd hottest to be equal to hottest (block 1024) and sets hottest to be equal to AS (block 1026). Then, the virtual machine considers the next subclass in C (block 1032), and operation loops back to block 1018 for the next subclass.

If AS is not hotter than hottest in block 1022, the virtual machine determines whether 2nd hottest is NULL or AS is hotter than 2nd hottest (block 1028). If 2nd hottest is NULL or AS is hotter than 2nd hottest, then the virtual machine sets 2nd hottest to be equal to AS (block 1030). Then, the virtual machine considers the next subclass in C (block 1032), and operation loops back to block 1018 for the next subclass. If the subclass does not override A in block 1020 or 2nd hottest is not NULL and AS is not hotter than 2nd hottest in block 1028, then the virtual machine considers the next subclass in C (block 1032), and operation loops back to block 1018 for the next subclass.

If the last subclass in C is reached in block 1032, then the virtual machine releases the lock (block 1034). Thereafter, the virtual machine determines whether hottest is hot enough and significantly hotter than 2nd hottest (block 1036), for example by the methods described in respect of FIG. 6 and FIG. 7. If hottest is hot enough and significantly hotter than 2nd hottest, then the virtual machine returns hottest (block 1038), and operation ends; otherwise, the virtual machine returns NULL (block 1040), and operation ends.

Figure 11:
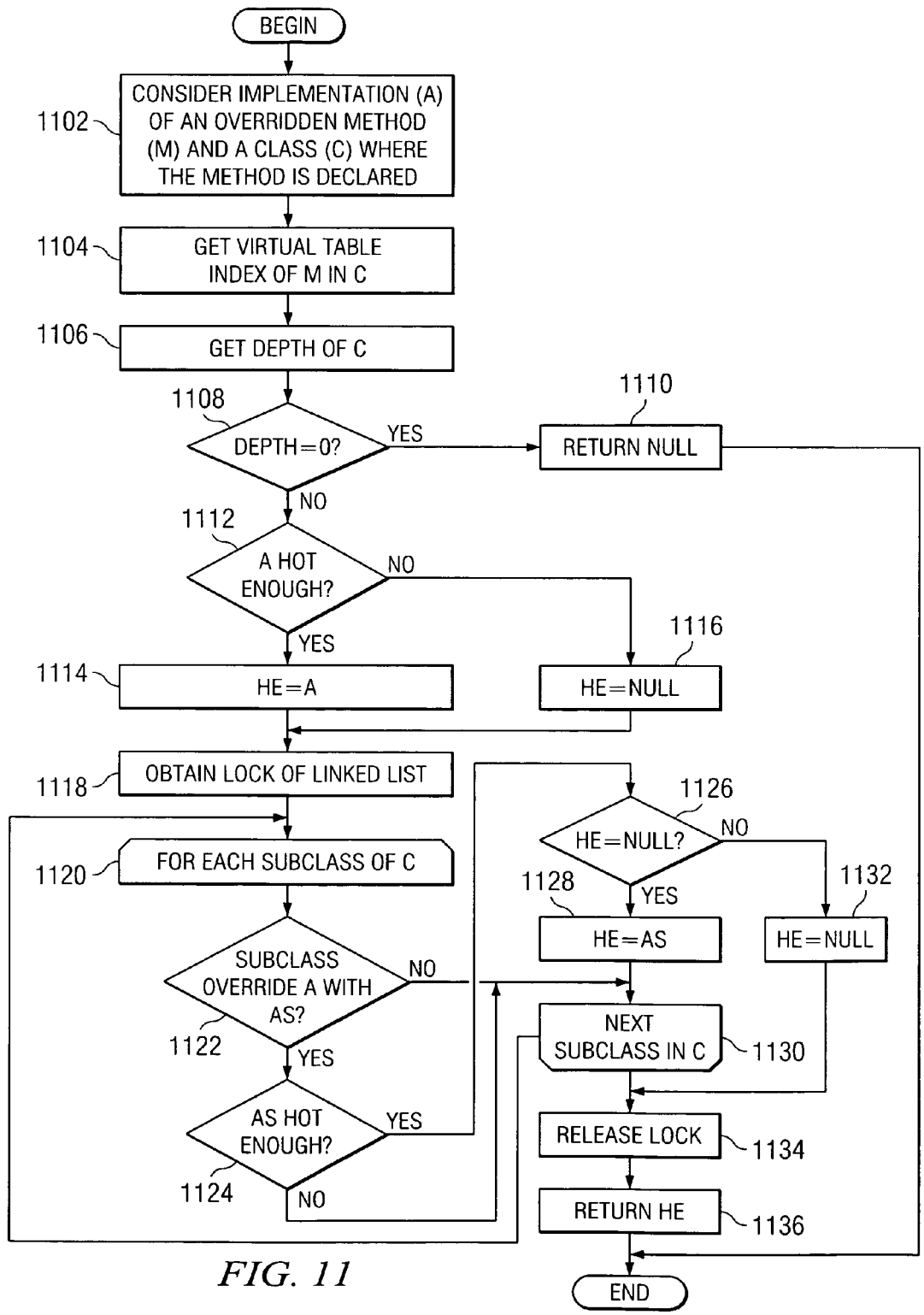
FIG. 11 is a flowchart illustrating the operation of a virtual machine for finding a single hot enough implementation in accordance with an exemplary embodiment.

FIG. 11 is a flowchart illustrating the operation of a virtual machine for finding a single hot enough implementation in accordance with an exemplary embodiment. If there is more than one hot enough implementation or no hot enough implementations, NULL is returned. This process is an alternative expansion of block 810 in FIG. 8.

Operation begins and the virtual machine considers an implementation, A, of an overridden method, M, and a class, C, where the method is declared (block 1102). The virtual machine gets the virtual table index of M in C (block 1104) and gets the depth of C (block 1106). The virtual machine determines whether the depth of C is zero (block 1108). If the depth of C is zero, the virtual machine returns NULL (block 1110). Thereafter, operation ends. However, if the depth of C is not zero in block 1108, the virtual machine determines whether A is hot enough (block 1112).

If A is hot enough, the virtual machine sets HE to be equal to A (block 1114); otherwise, the virtual machine sets HE to be NULL (block 1116). Thereafter, the virtual machine obtains a lock on the linked list (block 1118) of subclasses of class C.

For each subclass of C (block 1120), the virtual machine determines whether the subclass overrides A with an implementation, AS, of M (block 1122). If the subclass overrides A, the virtual machine determines whether AS is hot enough (block 1124). If AS is hot enough, then the virtual machine determines whether HE is NULL (block 1126). If HE is NULL, the virtual machine sets HE to be equal to AS (block 1128). Then, the virtual machine considers the next subclass in C (block 1130), and operation loops back to block 1120 for the next subclass. If the subclass does not override A in block 1122 or AS is not hot enough in block 1124, the virtual machine considers the next subclass in C (block 1130), and operation loops back to block 1120 for the next subclass.

If HE is not NULL in block 1126, then the virtual machine sets HE to be NULL (block 1132). Next, or when the last subclass in C is reached in block 1130, the virtual machine releases the lock (block 1134) and returns HE as the single hot enough implementation for inlining, or NULL, as the case may be (block 1136). Thereafter, operation ends.

Thus, the exemplary embodiments provide a technique for inlining methods that does not require call-profiling data, but rather decides which implementation of a virtual overridden method to inline based on its relative hotness. Inlining of a virtual method implementation is generally beneficial if the inlined implementation is the one that nearly always gets invoked. In that case, the virtual method invocation is saved and the code gets executed directly.

Without call-edge profiling information, there is no way to tell accurately which implementation is most likely to be invoked from a given call point. However, in some cases, although a method has multiple implementations, only one of its implementations gets invoked most of the time. This may mean that all hot methods that invoke the method are highly likely to call that particular implementation most of the time. In this case, the technique described herein still can get the inlining opportunity and the performance benefit that it entails, without needing to resort to gathering and managing call-edge profiling information, which can result in significant overhead.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of compiling code in a virtual machine, the computer implemented method comprising:

identifying an overridden method, wherein the overridden method is called by a calling method;

selecting an implementation of the overridden method based on a hotness value derived from invocation count and sampling count already collected in the virtual machine comprising:

determining whether the overridden method to be called by the calling method is abstract; and responsive to determining that the overridden method to be called by the calling method is abstract, selecting an implementation of the overridden method that is an only implementation of the overridden method if the hotness value corresponding to the only implementation exceeds a predefined threshold; and inlining, with a guard, the selected implementation of the overridden method within the calling method.

2. The computer implemented method of claim 1, wherein selection of the implementation of the overridden method does not require collection of any additional profiling information.

3. The computer implemented method of claim 1, wherein selecting the implementation of the overridden method further comprises:

responsive to a determination that the overridden method to be called by the calling method is not abstract, selecting a implementation from one or more candidate implementations of the overridden method as the selected implementation based on the hotness value.

4. The computer implemented method of claim 1, wherein selecting the implementation of the overridden method further comprises:

responsive to a determination that the overridden method to be called by the calling method is not abstract, selecting a single hot enough implementation of the overridden method as the selected implementation.

5. The computer implemented method of claim 3, wherein selecting the implementation of the overridden method further comprises:

selecting a significantly hottest hot enough candidate implementation of the overridden method as the selected implementation.

6. The computer implemented method of claim 1, wherein determining that the hotness value exceeds the predefined threshold comprises:

determining that the hotness value of the selected implementation is greater than or equal to a heuristic value multiplied by the predefined threshold.

7. The computer implemented method of claim 3, wherein selecting the implementation of the overridden method comprises:

determining whether one candidate implementation of the overridden method is hotter than another candidate implementation of the overridden method.

8. The computer implemented method of claim 7, wherein the one candidate implementation of the overridden method has a first hotness value, wherein the another candidate implementation of the overridden method has a second hotness value, and wherein the one candidate implementation is hotter than the another candidate implementation when the first hotness value is greater than the second hotness value.

9. The computer implemented method of claim 3, wherein selecting the implementation of the overridden method comprises:
determining whether one candidate implementation of the overridden method is significantly hotter than another candidate implementation of the overridden method.

10. The computer implemented method of claim 9, wherein the one candidate implementation of the overridden method has a first hotness value, wherein the another candidate implementation of the overridden method has a second hotness value, and wherein determining whether the one candidate implementation of the overridden method is significantly hotter than the another candidate implementation of the overridden method comprises:
determining whether a difference between the first hotness value and the second hotness value is greater than or equal to a second predefined threshold.

11. A data processing system, comprising:
a processor; and
a virtual machine executing on the processor, wherein the virtual machine is configured to identify an overridden method, wherein the overridden method is called by a calling method;
wherein the virtual machine is configured to select an implementation of the overridden method based on a hotness value derived from invocation count and sampling count already collected in the virtual machine by determining whether the overridden method to be called by the calling method is abstract and, responsive to determining that the overridden method to be called by the calling method is abstract, selecting an implementation of the overridden method that is an only implementation of the overridden method if the hotness value corresponding to the only implementation exceeds a predefined threshold; and
wherein the virtual machine is configured to inline, with a guard, the selected implementation of the overridden method within the calling method.

12. The data processing system of claim 11, wherein the virtual machine is configured to select the implementation of the overridden method without collecting any additional profiling information.

13. The data processing system of claim 11, wherein the virtual machine is configured to select the implementation of the overridden method by selecting a significantly hottest hot enough implementation of the overridden method as the selected implementation in response to determining that the overridden method to be called by the calling method is not abstract.

14. The data processing system of claim 11, wherein the virtual machine is configured to select the implementation of the overridden method by selecting a single hot enough implementation of the overridden method as the selected implementation in response to determining that the overridden method to be called by the calling method is not abstract.

15. The data processing system of claim 11, wherein the virtual machine is configured to determine whether the hotness value exceeds the predefined threshold by determining that the hotness value is greater than or equal to a heuristic value multiplied by the predefined threshold.

16. The data processing system of claim 13, wherein the virtual machine is configured to select the significantly hottest hot enough implementation of the overridden method by determining whether one candidate implementation of the overridden method is significantly hotter than another candidate implementation of the overridden method.

17. A non-transitory computer program product for compiling code, the computer program product having computer usable program code, the computer usable program code comprising:
computer usable program code configured to identify an overridden method, wherein the overridden method is called by a calling method;
computer usable program code configured to select an implementation of the overridden method based on a hotness value derived from invocation count and sampling count already collected in the virtual machine wherein the computer usable program code configured to select the implementation of the overridden method comprises:
computer usable program code configured to determine whether the overridden method to be called by the calling method is abstract; and
computer usable program code configured to select, in response to determining that the overridden method to be called by the calling method is abstract, an implementation of the overridden method that is the only implementation of the overridden method if the hotness value corresponding to the only implementation exceeds a predefined threshold; and
computer usable program code configured to inline, with a guard, the selected implementation of the overridden method within the calling method.

18. The computer program product of claim 17, wherein the computer usable program code configured to select the implementation of the overridden method does not collect any additional profiling information.

19. The computer program product of claim 17, wherein the computer usable program code configured to select the implementation of the overridden method further comprises:
computer usable program code configured to select, in response to a determination that the overridden method to be called by the calling method is not abstract, a significantly hottest hot enough implementation of the overridden method as the selected implementation.

20. The computer program product of claim 17, wherein the computer usable program code configured to select the implementation of the overridden method further comprises:
computer usable program code configured to select, in response to a determination that the overridden method to be called by the calling method is not abstract, a single hot enough implementation of the overridden method as the selected implementation.

21. The computer program product of claim 17, wherein the computer usable program code configured to determine that the hotness value exceeds the predefined threshold comprises:
computer usable program code configured to determine that the hotness value is greater than or equal to a heuristic value multiplied by the predefined threshold.

22. The computer program product of claim 19, wherein the computer usable program code configured to select the significantly hottest hot enough implementation of the overridden method comprises:
computer usable program code configured to determine whether one candidate implementation of the overridden method is significantly hotter than another candidate implementation of the overridden method.

* * * * *